United States Patent [19]
Ohkura et al.

[11] Patent Number: 4,560,237
[45] Date of Patent: Dec. 24, 1985

[54] LENS DRIVING APPARATUS IN CAMERAS

[75] Inventors: Zenichi Ohkura, Ichikawashi; Shinsuke Kohmoto, Tokyo, both of Japan

[73] Assignee: Asahi Kogaku Kogyo Kabushiki Kaisha, Tokyo, Japan

[21] Appl. No.: 495,378

[22] Filed: May 17, 1983

[30] Foreign Application Priority Data

Jun. 7, 1982 [JP] Japan ............................ 57-84235[U]

[51] Int. Cl.[4] .............................................. G02B 7/04
[52] U.S. Cl. .................................................... 350/255
[58] Field of Search ........................ 350/255, 428–430, 350/564, 589

[56] References Cited

U.S. PATENT DOCUMENTS

| | | | |
|---|---|---|---|
| 3,233,514 | 2/1966 | Eberhardt | 350/429 |
| 3,482,500 | 12/1969 | Thomas | 350/255 |
| 3,709,132 | 1/1973 | Farrell et al. | 350/255 |

FOREIGN PATENT DOCUMENTS

| | | | |
|---|---|---|---|
| 3123745 | 3/1982 | Fed. Rep. of Germany | 350/255 |
| 12605 | 2/1981 | Japan | 350/255 |
| 292470 | 10/1929 | United Kingdom | 350/589 |

*Primary Examiner*—William H. Punter
*Attorney, Agent, or Firm*—Flynn, Thiel, Boutell & Tanis

[57] ABSTRACT

A helicoid ring and a focusing actuation ring are movably arranged on an inner periphery and an outer periphery of a stationary lens barrel which supports a focusing movable lens assembly, respectively. The helicoid ring and the focusing actuation ring have gears which are operatively connected to each other by means of a pinion which is rotatably supported by the stationary lens barrel and which extends through an opening formed in the stationary lens barrel so that the pinion comes into engagement with the gears of the helicoid ring and the gears of the focusing actuation ring on the inside and outside, of the stationary lens barrel.

7 Claims, 4 Drawing Figures

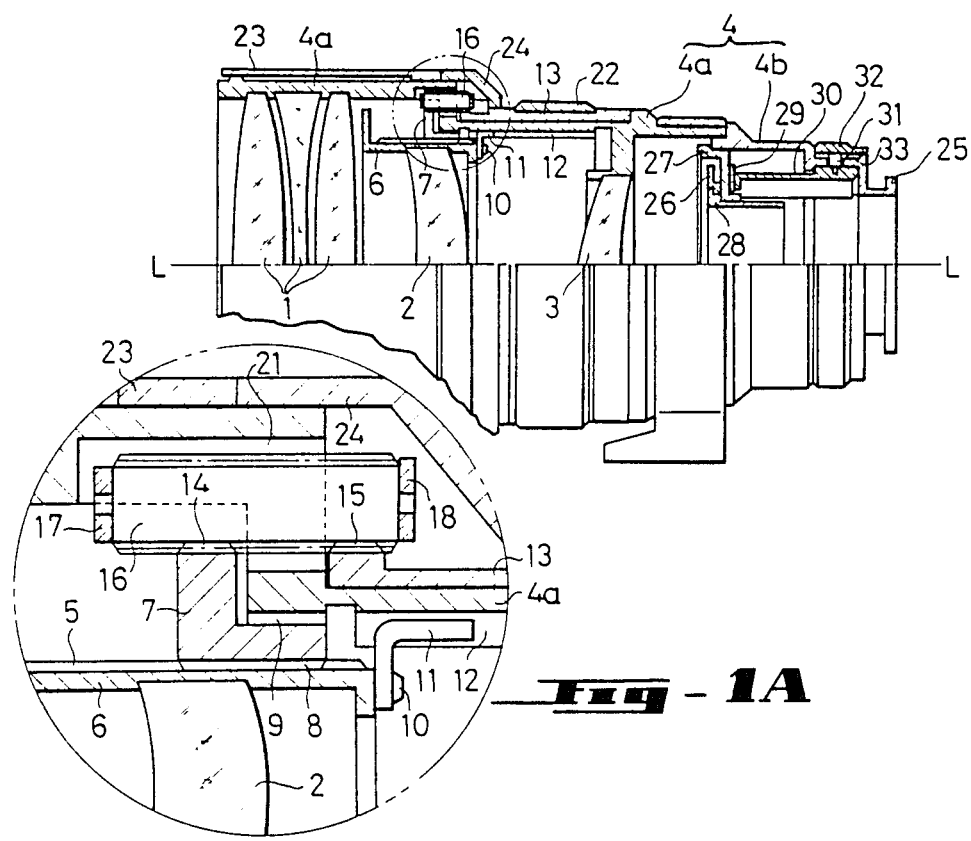

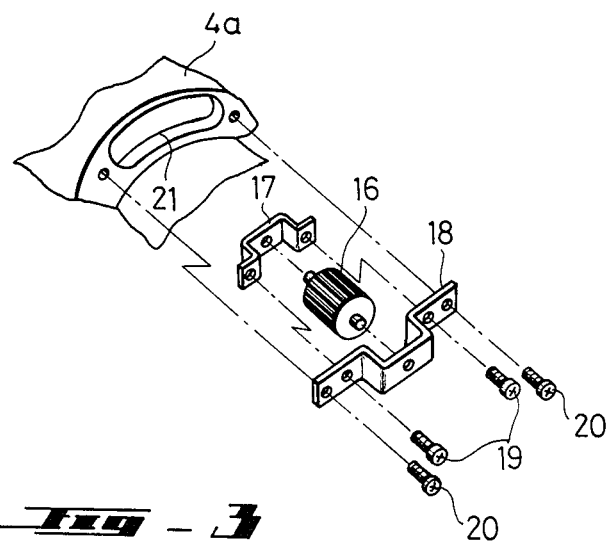
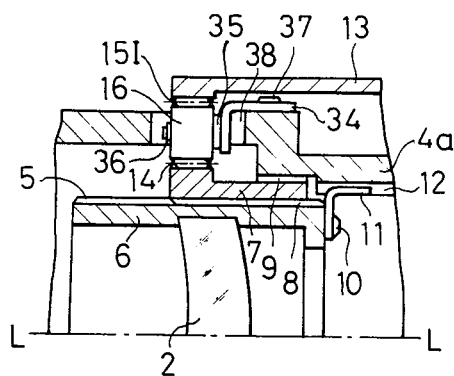

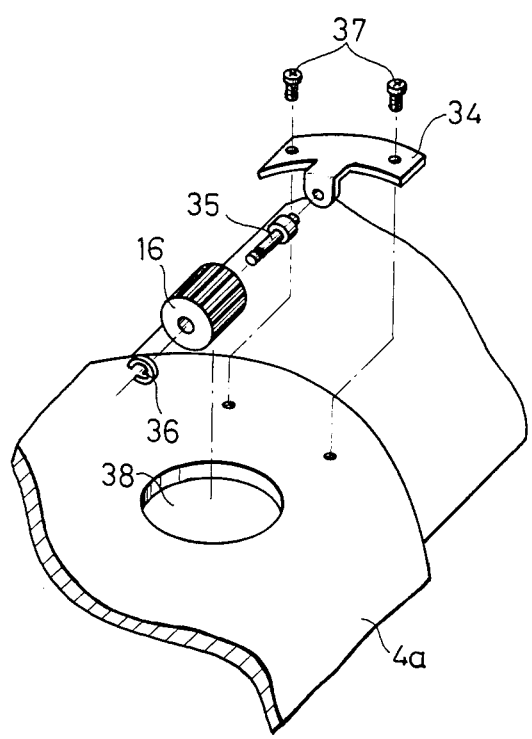

LENS DRIVING APPARATUS IN CAMERAS

This invention relates to a lens driving appratus in a camera.

Focusing of camera lenses is usually effected by moving the whole of lenses. However, such a focusing system in which the entirety of lenses are moved cannot be advantageously used for telephoto lenses or ultra-telephoto lenses, because focusing needs a large displacement of the lenses. The large displacement of the lenses results in a change of the center of gravity of the whole of the lenses and in an uneasy focusing. This also results in a difficulty in decreasing of a minimum object distance.

In order to solve the above-mentioned problems, there has been proposed a focusing system in which a front (first) group of lenses are immovable and a rear (second) group of lenses or only a part thereof is moved to effect focusing. The second group of lenses are, generally, smaller and lighter than the first group of lenses. In this focusing system, the movable lenses are moved in the optical axis direction by a helicoid mechanism. The helicoid mechanism has a focusing actuation ring fitted on the outer periphery of a stationary lens barrel which supports the front group of lenses and a helicoid ring fitted in the inner periphery of the stationary lens barrel for moving the movable lenses. The helicoid ring can be rotated by the rotation of the focusing actuation ring. The focusing actuation ring is operably connected to the helicoid ring by means of a connecting member which extends through a peripherally extending slot formed in the stationary lens barrel. Since the peripheral slot enables the focusing actuation ring to rotate, it is necessary to increase the peripheral length of the peripheral slot in order to make a large angular displacement of the focusing actuation ring possible. However, the increase of the peripheral length of the slot decrease the strength of the stationary lens barrel, so that the latter cannot support the large and heavy lenses. In other words, the angular displacement of the focusing actuation ring is limited and determined by the length of the peripheral slot which is formed in the stationary lens barrel. On the other hand, the displacement of the movable lenses in the optical axis direction must be increased to enable a fine adjustment of focusing or to decrease a minimum object distance. Therefore, in some cases, the focusing actuation ring is required to rotate through an angular displacement above 360°. However, prior art focuing system as mentioned above cannot satisfy the requirement, because of the limited peripheral length of the peripheral slot formed in the stationary lens barrel.

The primary object of the present invention is to solve the aforementioned problems by providing an apparatus for moving the lenses in which the helicoid ring and the focusing actuation ring have integrally respective gears which rotate about the optical axis and which are connected to each other by means of a pinion to transmit the rotational movement of the focusing actuation ring to the helicoid ring. With this arrangement, since the stationary lens barrel has a peripheral recess having a small peripheral length enough to receive the pinion therein, not only the stationary lens barrel has a large strength, but also no limitation is added to the angular displacement of the focusing actuation ring, thus resulting in an increase of the axial displacement of the movable lenses.

The invention will be described below in detail with reference to the drawings, in which:

FIG. 1 is a longitudinal sectional view of an apparatus for moving the lenses, according to the present invention;

FIG. 1A is an enlargement of the encircled fragment in FIG. 1.

FIG. 2 is an exploded perspective view of a main part of an apparatus shown in FIG. 1;

FIG. 3 is a longitudinal sectional view of a main part of a different embodiment of an apparatus for moving the lenses; and, FIG. 4 is an exploded perspective view of an apparatus shown in FIG. 3.

With reference to FIGS. 1 and 2 showing the first embodiment of the invention, numeral 1 designates a front group of lenses which will be referred to as a front lens assembly, hereinafter, and 2 and 3 a rear group of lenses which will be referred to as rear lens assembly, hereinafter. The front lens assembly 1 and the rear lens assembly 3 are secured to front and rear portions of a front stationary lens barrel 4a, respectively. The rear lens assembly 2 which is a focusing movable lens is supported by a helicoid cylinder 6 which is provided, on its outer periphery, with a male helicoid 5. The helicoid 5 is engaged by a female helicoid 8 of a helicoid ring 7 which has a threaded portion 9 engaged by a corresponding inner peripheral threaded portion of the front stationary lens barrel 4a so that the helicoid ring 7 can rotate about an optical axis L—L of the lens assemblies 1,2 and 3 and by said rotation be shifted axially. The helicoid cylinder 6 has a guide plate 11 secured to the rear end thereof by means of machine screws 10. The guide plate 11 is fitted in a guide groove 12 which is formed in the lens barrel 4a to translate the guide plate 11 only in the optical axis direction without rotation. Therefore, when the helicoid ring 7 is driven to rotate by means of any drive (not shown), the helicoid cylinder 6 and accordingly the rear lens assembly 2 moves in the optical axis direction without rotation, through the helicoids 5 and 8.

On the outer periphery of the front stationary lens barrel 4a is rotatably provided a focusing actuation ring 13 which is provided, on its outer periphery, with outer gear teeth 15. On the other hand, the helicoid ring 7 is also provided, on its outer periphery, with outer gear teeth 14. The gear teeth 14 and 15 form first and second gears, respectively, which rotate about the optical axis L—L and which are meshed with a common pinion 16 rotatably held by the stationary lens barrel 4a. The pinion 16 is rotatably supported at its one end by a bearing plate 17 and at its opposite end by a mounting plate 18 as shown in FIG. 2. The bearing plate 17 is rigidly connected to the mounting plate 18 by means of machine screws 19. The mounting plate 18 is secured to the front lens barrel 4a by means of machine screws 20. The pinion 16 extends through an opening (peripheral slot) 21 formed in the stationary lens barrel 4a, from the inside to the outside, of the lens barrel 4a. The pinion 16 comes in mesh with the gear 15 of the focusing actuation ring 13 outside of the lens barrel 4a and with the gear 14 of the helicoid ring 7 within the inside of the lens barrel 4a. The axial length of the pinion 16 is such that the pinion 16 does not come out of the engagement of the helicoid 7 while rotating and (being moved axially) by the threaded portion 9.

A rubber ring 22 is fitted on the focusing actuation ring 13. On the front end of the lens barrel 4a is provided a hood 23 is prevented from coming out of the front end of the lens barrel by means of a cover ring 24 which is also adapted to cover and protect the pinion 16.

The stationary lens barrel 4 is composed of the aforementioned front lens barrel 4a and a rear lens barrel 4b having a mount 25 which can be detachably attached to a camera body (not shown). As is well known, a diaphragm mechanism is incorporated in the rear lens barrel 4b. The diaphragm mechanism has diaphragm blades (not shown) which are actuated by an operation ring 26 which is rotatably supported by the rear lens barrel 4b by means of a mount ring 27 and a supporting cylinder 28. The rotation of the operation ring 26 is controlled by a cam plate 29 which is rigidly connected to a diaphragm rotating rod 30. The rod 30 is provided with a projection 31 which is, for example, a bolt screwed in the rod 30 and which extends through a peripheral groove of the rear lens barrel 4b, so that the upper end of the projection 31 is fitted in an axial groove 33 of an exposure scale ring (F number ring) 32. The rotation of the exposure scale ring 32 causes the cam plate 29 to rotate in order to control the angular displacement of the operation ring 26, so that a desired aperture corresponding to the F number can be obtained. The above-mentioned diaphragm mechanism is well known and is not a part of the invention, and accordingly, no further detailed description will be given hereinafter.

As described above, when the focusing actuation ring 13 rotates, the pinion 16 which engages with the gear 15 rotates in the opposite direction, so that the helicoid ring 7 which has the gear 14 engaging with the pinion 16 rotates in the same direction as the actuation ring 13. The rotation of the helicoid ring 7 causes the helicoid cylinder 6 and accordingly the rear lens assembly 2 to move in the optical axis direction by a resultant lead of the helicoids 5 and 8 and the threaded portion 9, thus resulting in a completion of focusing.

FIGS. 3 and 4 show another embodiment of the invention, in which the outer peripheral gear 15 of the focusing actuation ring 13 in the first embodiment shown in FIGS. 1 and 2 is replaced by an inner peripheral gear 15I which engages with the pinion 16. The pinion 16 is rotatably supported on a shaft 35 which is secured to a fixing plate 34. The fixing plate 34 is secured to the lens barrel 4a by means of machine screw 37. The pinion 16 is prevented from coming out from the shaft 35 by means of a snap ring 36. The pinion 16 centrally extends through a circular hole 38 formed in the stationary lens barrel 4a from the inside to the outside, of the stationary lens barrel. The pinion 16 comes into engagement with the inner peripheral gear 15I outside of the lens barrel and with the outer peripheral gear 14 of the helicoid ring 7 inside of the lens barrel, respectively. Constructions other than above-mentioned arrangement in the second embodiment are similar to those of the first embodiment, and, accordingly, will be not discussed further. Components corresponding to those in FIGS. 1 and 2 are designated by the same numerals as those in FIGS. 1 and 2.

In the second embodiment, the helicoid ring 7 and the focusing actuation ring 13 rotates in opposite directions. However, since the direction of the movement of the rear lens assembly 2 along the optical axis depends on the direction of the threads of the helicoids 5 and 8 and the threaded portion 9, i.e., on right-hand screws or left hand screws, focusing can be effected quite similarly to the first embodiment by properly selecting the direction of the threads.

The pinion 16 is preferably made of synthetic resin, so that noises which occur when the pinion 16 rotates at a relatively high speed during the rotation of the actuation ring 13 can be effectively decreased. In case where there is a large difference in diameter between the focusing actuation ring 13 and the helicoid ring 7, a gear train consisting of a plurality of gears may be provided between the focusing actuation ring 13 and the helicoid ring 7 to control direction of rotation and number of revolution, of the helicoid ring 7.

As can be understood from the above disucussion, according to the invention, since both the focusing actuation ring and the helicoid ring are provided with the gears which are operatively connected to each other by means of a pinion which extends through an opening formed in the stationary lens barrel to transmit the rotation of the focusing actuation ring to the helicoid ring, the opening to be formed in the stationary lens barrel which supports heavy and large front lens assembly can be minimized, so that the lens barrel has a sufficient strength. Futhermore, according to the invention, since the angular displacement of the focusing actuation ring is not limited, the movable lenses have a large degree of freedom of movement. Finally, according to the present invention, since the helicoid ring is driven by the gear mechanism, focusing can be electrically and automatically effected by connecting the gear mechanism to an electrical drive such as a motor.

We claim:

1. In an optical lens system having a stationary lens barrel and at least two groups of lenses having a same optical axis, of which the first group of lenses have a stationary lens assembly supported by the stationary lens barrel, and the second group of lenses have at least one movable focusing lens, wherein an apparatus for moving the movable focusing lens comprises a helicoid ring which is provided coaxially within the stationary lens barrel for rotation to cause the movable focusing lens to move along the optical axis and which is provided with a first gear, a focusing actuation ring which is coaxially and rotatably provided on the outer periphery of the stationary lens barrel and which is provided with a second gear, and a gear means which is rotatably supported by the stationary lens barrel and which comes into engagement with the first gear and the second gear to transmit the rotational movement of the focusing actuation ring to the helicoid ring.

2. An apparatus according to claim 1, wherein said stationary lens barrel has an opening adjacent said helicoid ring and through which the gear means extends to come into engagement with the first gear of the helicoid ring and the second gear of the focusing actuation ring on the inside and the outside of the stationary lens barrel, respectively.

3. An apparatus according to claim 1, wherein said gear means comprises a pinion made of synthetic resin material.

4. An apparatus according to Claim 1, wherein said helicoid ring is threadedly connected with respect to said stationary lens barrel so as to move axially upon rotation, and said gear means comprises a pinion which has an axial length enough to ensure that it continuously comes into engagement with the first gear of the helicoid ring during the axial movement of the latter.

5. An apparatus according to claim 1, wherein said second gear of the focusing actuation ring comprises teeth formed on the outer periphery of the focusing actuation ring.

6. An apparatus according to claim 1, wherein said second gear of the focusing actuation ring comprises teeth formed on the inner periphery of the focusing actuation ring.

7. In an optical lens system having a stationary lens barrel which supports at least one movable focusing lens, wherein a device for moving the movable focusing lens comprises a helicoid ring which is rotatably and coaxially arranged in an inner periphery of the stationary lens barrel to move the movable focusing lens in an optical axis direction of the lens and which is provided with a first gear, a focusing actuation ring which is rotatably and coaxially arranged on the outer periphery of the stationary lens barrel and which is provided with a second gear, and a rotatable gear means which engages the first gear and the second gear to transmit the rotational movement of the focusing actuation ring to the helicoid ring.

* * * * *